(12) United States Patent
Jokinen et al.

(10) Patent No.: US 10,731,742 B2
(45) Date of Patent: Aug. 4, 2020

(54) AXLE COUPLER WITH RING RECESS

(71) Applicant: Torq-Masters Industries, Inc, Victor, NY (US)

(72) Inventors: Cora Jokinen, Victor, NY (US); John H. Zentmyer, Lakeside, CA (US)

(73) Assignee: Torq-Masters Industries, Inc, Victor, NY (US)

( * ) Notice: Subject to any disclaimer, the term of this patent is extended or adjusted under 35 U.S.C. 154(b) by 0 days.

(21) Appl. No.: 16/210,145

(22) Filed: Dec. 5, 2018

(65) Prior Publication Data

US 2019/0277382 A1    Sep. 12, 2019

Related U.S. Application Data

(60) Provisional application No. 62/596,138, filed on Dec. 8, 2017.

(51) Int. Cl.
| | |
|---|---|
| *F16H 48/28* | (2012.01) |
| *F16D 43/30* | (2006.01) |
| *F16H 48/24* | (2006.01) |
| *F16H 48/08* | (2006.01) |
| *F16D 43/20* | (2006.01) |

(52) U.S. Cl.
CPC .......... *F16H 48/28* (2013.01); *F16D 43/30* (2013.01); *F16H 48/24* (2013.01); *F16D 43/20* (2013.01); *F16H 2048/082* (2013.01); *F16H 2048/085* (2013.01)

(58) Field of Classification Search
CPC .... F16H 2048/082; F16H 48/28; F16H 48/24; F16H 2048/85; F16H 48/19; F16D 43/20
USPC .......... 475/220, 230, 231, 240, 241; 74/650; 403/359.1, 359.4, 359.6
See application file for complete search history.

(56) References Cited

U.S. PATENT DOCUMENTS

| | | |
|---|---|---|
| 1,430,744 A | 10/1922 | Lewis |
| 1,477,137 A | 12/1923 | Lewis |
| 1,711,371 A | 4/1929 | Zentmyer |
| 2,555,044 A | 5/1951 | Lewis |
| 3,745,800 A | 7/1973 | Zentmyer |
| 4,071,808 A | 1/1978 | Zentmyer |
| 4,109,912 A | 8/1978 | Zentmyer |
| 4,498,355 A | 2/1985 | Schou |
| 4,759,232 A | 7/1988 | Roberts |
| 5,413,015 A | 5/1995 | Zentmyer |
| 5,590,572 A | 1/1997 | Valente |
| 5,591,098 A | 1/1997 | Jones et al. |

(Continued)

OTHER PUBLICATIONS fourwheeler.com, "Traction Does Matter," www.fourwheeler.com/how-to/29298-latest-locking-differential-technology/ Mar. 1, 2000.

*Primary Examiner* — Roger L Pang
(74) *Attorney, Agent, or Firm* — Michael J. Nickerson; Basch & Nickerson LLP

(57) ABSTRACT

An axle coupler comprises driver teeth to engage teeth of a corresponding driver; a central aperture having a central axis and a circumference; and the central aperture including axle teeth circumferentially surrounding the central axis; each axle tooth having a first dimensional direction parallel to the central axis; each axle tooth having a second dimensional direction orthogonal to the first dimensional direction; a recess formed in each axle tooth to form a first axle tooth portion and a second axle tooth portion.

5 Claims, 6 Drawing Sheets

(56) References Cited

U.S. PATENT DOCUMENTS

| | | |
|---|---|---|
| 5,603,246 A | 2/1997 | Zentmyer |
| 5,637,049 A | 6/1997 | Zentmyer |
| 5,715,733 A | 2/1998 | Dissent |
| 5,759,126 A | 6/1998 | Zentmyer et al. |
| 5,759,129 A | 6/1998 | Zentmyer et al. |
| 5,816,971 A | 10/1998 | Zentmyer et al. |
| 5,836,220 A | 11/1998 | Valente |
| 5,901,618 A | 5/1999 | Tyson et al. |
| 5,983,754 A | 11/1999 | Tyson et al. |
| 6,014,916 A | 1/2000 | Tyson |
| 6,047,615 A | 4/2000 | Tyson et al. |
| 6,053,073 A | 4/2000 | Tyson et al. |
| 6,053,074 A | 4/2000 | Tyson et al. |
| 6,062,105 A | 5/2000 | Tyson et al. |
| 6,092,439 A | 7/2000 | Tyson et al. |
| 6,105,465 A | 8/2000 | Tyson et al. |
| 6,269,712 B1 | 8/2001 | Zentmyer |
| D479,543 S | 9/2003 | Lannoch |
| 6,681,654 B2 | 1/2004 | Zentmyer |
| 7,491,127 B2 * | 2/2009 | Bristol .................... F16D 3/06 403/359.6 |
| 7,677,984 B2 * | 3/2010 | Hahn .................... F16D 3/845 464/182 |
| 8,485,798 B2 * | 7/2013 | Sheth .................... F04D 13/022 403/300 |
| D720,377 S | 12/2014 | Edler |
| 9,488,265 B2 | 11/2016 | Elder |
| 2002/0151402 A1 | 10/2002 | Zentmyer |
| 2007/0006673 A1 | 1/2007 | Peterman et al. |
| 2008/0176703 A1 | 7/2008 | Hoberg |
| 2009/0011890 A1 | 1/2009 | Bawks |
| 2009/0107741 A1 | 4/2009 | Bell et al. |
| 2009/0197732 A1 | 8/2009 | Lyman |
| 2010/0113208 A1 | 5/2010 | Haugeberg |
| 2011/0143878 A1 * | 6/2011 | Juenemann .......... B60K 17/348 475/220 |
| 2014/0329634 A1 * | 11/2014 | Biermann .............. F16H 48/11 475/220 |
| 2016/0273637 A1 * | 9/2016 | Zaers .................... F16H 48/08 |
| 2017/0219023 A1 * | 8/2017 | Haupt .................... F16H 48/08 |
| 2018/0209486 A1 * | 7/2018 | Haupt .................... F16H 48/24 |

* cited by examiner

AXLE COUPLER WITH RING RECESS

PRIORITY INFORMATION

The present application claims priority, under 35 U.S.C. § 119(e), from U.S. Provisional Patent Application Ser. No. 62/596,138, filed on Dec. 8, 2017. The entire content of U.S. Provisional Patent Application Ser. No. 62/596,138, filed on Dec. 8, 2017, is hereby incorporated by reference.

BACKGROUND

Conventionally, vehicle locking differentials have been provided for co-axial arrangements of two drivers, two axle couplers, and a locking mechanism subject to differential rotational forces provided by respective left and right axles, which provide a locking or unlocking effect by such members.

FIG. 1 illustrates an exploded view of a locking differential. As illustrated in FIG. 1, a splined inner end (teeth) of axle 120 engages mating splines (teeth) in an axle coupler 122. In the shown embodiment, the axle 120 is retained in position by a C-clip 124. It is noted that the axle retention mechanism may be realized by bearings adjacent to wheel ends of the axles or other means such as a snap ring.

The axle coupler 122 have a plurality of drive teeth 126 on the face thereof which may mate with corresponding teeth on faces 128 of drivers 130, depending upon the axial position of the drivers. The drivers 130, in turn, have saddle-like depressions 132 on the opposite faces thereof for loosely surrounding a pinion pin 134 driven by the differential case.

The driver 130 has a spring 136 in angled blind holes in the driver 130, the spring 136 acting on pin 134 to both elastically encourage the drivers 130 to a position having the pin 134 aligned with the center of the saddle-like depressions 132, and to elastically encourage the drivers 130 axially outward away from the pin 134 into engagement with the axle couplers 122.

Spacers 138, together with any shims or thrust washers that may be required (not shown), establish and retain the axle couplers 122 at the desired separation from pin 134.

It is noted that the C-clip 124, when the differential is assembled, is located in a recess or cavity 150 of the spacer 138. In other words, the retention mechanism (C-clip 124) is positioned between the axle coupler 122 and the driver 130.

Finally, pins 140 on the drivers 130 fit within slots 142 on the opposing face of the opposite driver and function to control the angular displacement of the drivers 130 relative to each other.

In the final assembly, the springs 136 encourage the toothed face of the drivers 130 into engagement with the toothed face of axle couplers 122, and there is sufficient clearance between the saddle-like regions 132 and pin 134 in the final assembly for either driver 130 to move toward the pin 134 sufficiently to allow the teeth of a driver 130 to ride over the teeth of the associated axle coupler 122.

The operation of the differential of FIG. 1 may be explained as follows. With the teeth of the corresponding driver and axle coupler pairs engaged, the differential housing may rotate, carrying the pin from contact with one side of the saddle to the other, a displacement of (depending on the size of the design) 4 to 7 degrees. This free travel, or backlash, is essential for correct positioning of the differential components during the transition from driving to coasting and vice versa.

The drivers are retained with respect to each other by the pins 134 and mating slots 142 for a total rotation, one relative to the other, approximately 1.5 degrees or less than one-half the total backlash described previously. When the pin 134 engages the saddle-like depressions 132 on either driver, the force of the contact, by design of the saddles 132, will be angled outward from the plane of the respective driver and will overcome the component of the reaction force acting opposite created by the inclined edges on the mating teeth on the drivers 130 and axle couplers 122.

For example, saddle angles ranging from 30 to 40 degrees are typically used and create outward axial forces that exceed the inward axial forces created by typical 20 to 25 degree inclines of the coupler and driver mating teeth that would otherwise work to separate the driver from the coupler.

Using the foregoing parameters, consider first the vehicle at rest. Assume the two drivers 130 each engage with the respective axle coupler 122, and for specificity in the starting condition, that the pin 134 is centered in the saddle-like depressions 132 in the drivers 130. With the vehicle in gear and engine driving, the pin 134 begins to rotate about the axis of the axle, through the backlash present and compressing against springs 136 to contact the edges of the saddle-shaped depressions 132 in the drivers, and then on further rotation, to force the drivers 130 and axle couplers 122, and thus the axles, into rotation.

Since the contact angle between the pin 134 and the saddle-shaped depressions 132 exceeds the angle of the edge of the teeth on the axle couplers 122 and drivers 130, the force between the pin 134 and the drivers 130 forcing the same into contact against the axle couplers 122 will exceed the force between the inclined edges of the teeth on the drivers 130 and axle couplers 122 otherwise tending to force the drivers 130 back toward pin 134, so that the drivers 130 and axle couplers 122 will remain in positive engagement, regardless of the torque applied to the differential.

If the vehicle now proceeds to drive around a curve, the wheel on the outside of the curve, and thus the axle coupler 122 associated with that wheel, will tend to rotate faster than the axle coupler 122 associated with the inside wheel.

Assuming power is still being applied, this causes the driver 130 associated with the outside wheel to begin "gaining" with respect to pinion shaft 134, the driver 130 rotating forward to a position wherein the saddle-like depressions 132 thereon are no longer in contact with pin 134.

At this point, pins 140 and mating depressions 142 prevent the further relative rotation of the two drivers 130 but allow coaxial translation. Further gaining of the outside wheel continues to rotate the outside axle coupler 122 at a speed higher than the other differential components. Now, however, the teeth on the driver 130 associated with the outside wheel are free to climb the inclined planes of the teeth on the driver 130 and axle coupler 122, with the driver 130 moving toward the pin 134 against the resistance of the associated springs 136 to allow the teeth of the respective driver 130 to slide over the teeth of the respective axle coupler 122, repeatedly as required so long as the difference in wheel rotation speeds exist.

If, when in a curve, the vehicle engine is throttled back to coast and use the engine as a braking or vehicle slowing device, the same basic interaction of parts described above will occur substantially in reverse, now however with the driver and axle coupler associated with the outer wheel of the curve being engaged, and the driver associated with the inner wheel of the curve climbing over the teeth on the associated axle coupler as required to allow the inner wheel on the curve to turn slower than the outer wheel.

Similarly, in backing around a curve such as backing out of a parking place, the inner wheel will be the drive wheel, as in powering forward, whereas use of the engine to retard the motion of the vehicle when backing will engage the wheel on the outer side of the turn engaged. However in any event, when power is applied while turning to the point that traction is lost by the drive (inside) wheel, the pin 134 will catch up to and forcibly engage the appropriate side of the saddle-shaped depression 132 on the outside wheel driver 130, forcing both drivers 130 into engagement with their associated axle couplers 122 to force rotation of both axles in unison.

When utilizing an axle retention mechanism, it is desirable to provide a mechanism that enables the axle retention mechanism to securely engage an axle and the axle coupler.

Moreover, it is desirable, when utilizing an axle retention mechanism, to provide mechanism that enables the axle retention mechanism to securely engage an axle and the axle coupler without interfering with the engagement of the drive teeth of the axle coupler and the drive teeth of the driver.

Furthermore, it is desirable, when utilizing an axle retention mechanism, to provide a mechanism, located within the central aperture of the axle coupler, that enables the axle retention mechanism to securely engage an axle and the axle coupler without interfering with the engagement of the drive teeth of the axle coupler and the drive teeth of the driver.

BRIEF DESCRIPTION OF THE DRAWINGS

The drawings are only for purposes of illustrating various embodiments and are not to be construed as limiting, wherein.

DETAILED DESCRIPTION

Figure 1:
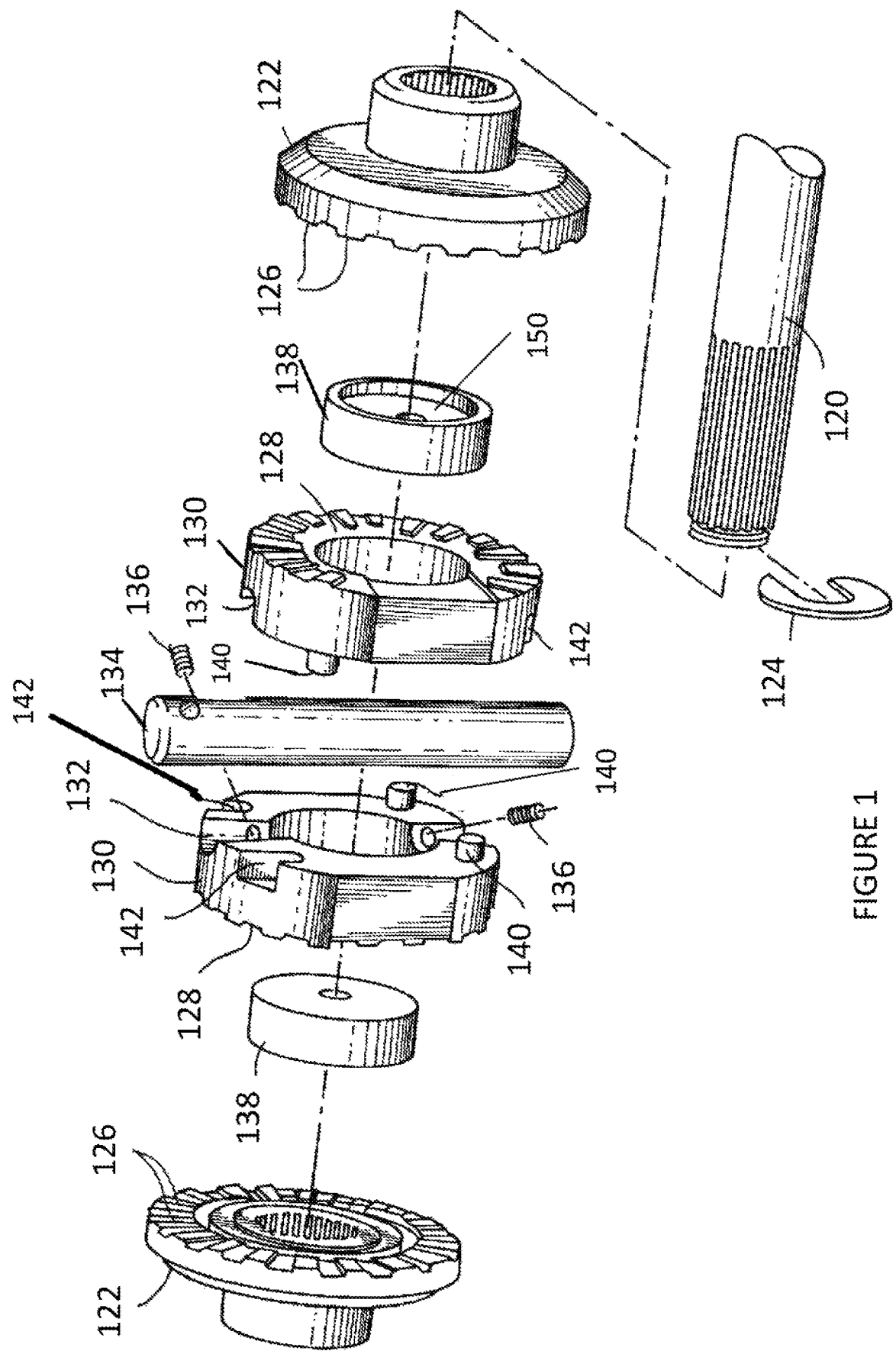
FIG. 1 illustrates an exploded view of a locking differential.

For a general understanding, reference is made to the drawings. In the drawings, like references have been used throughout to designate identical or equivalent elements. It is also noted that the drawings may not have been drawn to scale and that certain regions may have been purposely drawn disproportionately so that the features and concepts may be properly illustrated.

Figure 2:
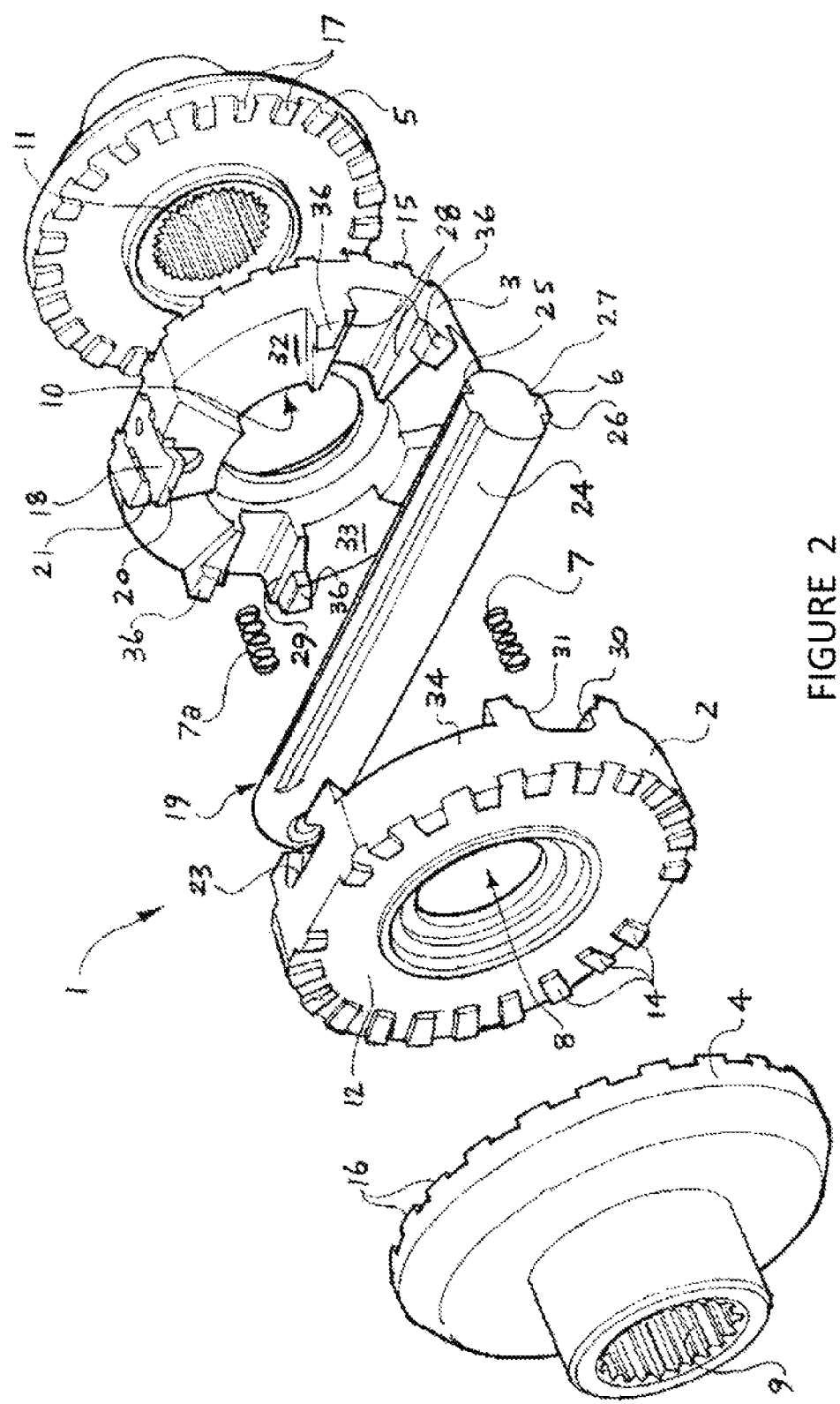
FIG. 2 illustrates an exploded view of another locking differential.

Another example of a conventional vehicle locking differential is illustrated in FIG. 2. As illustrated in FIG. 2, a locking differential 1 is installable into an existing differential case. The locking differential 1 includes two drivers (2 and 3) and two axle couplers (4 and 5), a pinion shaft 6, and helical springs (7 and 7*a*). Each of the drivers (2 and 3) and axle couplers (4 and 5) are arranged to be co-axially aligned, having appropriate located central apertures (8, 9, 10, and 11).

Each of the drivers (2 and 3) has an outwardly facing face (12 and 13), which have a plurality of drive teeth (14 and 15). The drive teeth (14 and 15) are arranged to mutually engage respective axle couplers (4 and 5). The axle couplers (4 and 5) have mutually engaging drive teeth (16 and 17).

The drivers (2 and 3) have a camming interrelationship therebetween provided by two diametrically opposite positioned tabs (18 and 19). Tabs (18 and 19) have at an outer end 20 with outwardly inclined edges (21 and 22), which are arranged to engage within a slot 23.

Slot 23, located in the opposite driver, is correspondingly shaped so as to receive the outer end 20 of the tab 18 so that, with relative movement, between the respective drivers, there will be, caused by a camming action, a pulling together, against the otherwise outward urging of the helical springs (7 and 7*a*), of the drivers (2 and 3). This pulling together occurs when an axle (not shown), coupled to one of the axle couplers (4 and 5), drives forwardly relative to the other.

As illustrated, the pinion shaft 6 includes lateral grooves (24 and 25) on one side and lateral grooves (26 and 27) on the other side. The grooves provide for lateral faces which engage against mutually positioned surfaces (28 and 29) with respect of driver 3 and surfaces (30 and 31) with respect of driver 4.

Since this arrangement relies upon a relative camming interrelationship realized by tab 18 and slot 23, the arrangement does not rely upon a camming effect provided by the drive teeth of a driver and the drive teeth of an axle coupler having inclined sides.

It is noted that the drive teeth (14, 15, 16, and 17) may have straight sides. In other words, the sides are shaped so as to be parallel to an engaging and disengaging direction between the drivers and axle couplers. Alternatively, the sides may be shaped to be perpendicular to the plane of rotation.

By having straight sides, a face to face contact for mutual driving force can be realized so that, for a given number and size of drive teeth, a larger horsepower can be transmitted between the drive teeth. Moreover, the straight sides, rather than slanted sides, allow for an effectively stronger assembly because the incoming torque can be applied directly to rotating the axles, resulting in negligible side loads inside the differential case.

In operation, the drive teeth of the respective drivers and axle couplers are engaged while a vehicle is moving straight ahead, but when the vehicle starts to turn, an outside coupler will begin to rotate faster than an inner one, and its respective driver will also briefly rotate along with the coupler.

As the axle coupler continues to rotate, part of the tab 18 will engage against an inclined side of the cavity or recess 23, pulling the respective driver inward until the drive teeth of the driver clear the respective axle coupler.

As the vehicle straightens out, the outside coupler rotation slows down and approaches that of its respective driver, such that the engaging cam surfaces 36 in the driver meets the pinion shaft 6 and the driver is cammed back into the drive teeth of the axle coupler to complete the interlocking.

As further illustrated in FIG. 2, cutouts (32, 33, and 34) are provided on the inner sides of the drivers (2 and 3) to enable installation of an axle retention C-clip between the respective axle coupler and driver by allowing the drivers (2 and 3) to nest back-to-back in a closer interfit relationship. This allows enough room for access between the respective axle coupler and driver to install the axle retention C-clip, without requiring the axle retention C-clip to be carefully slipped through a cutout in the drive teeth of the driver.

Figure 3:
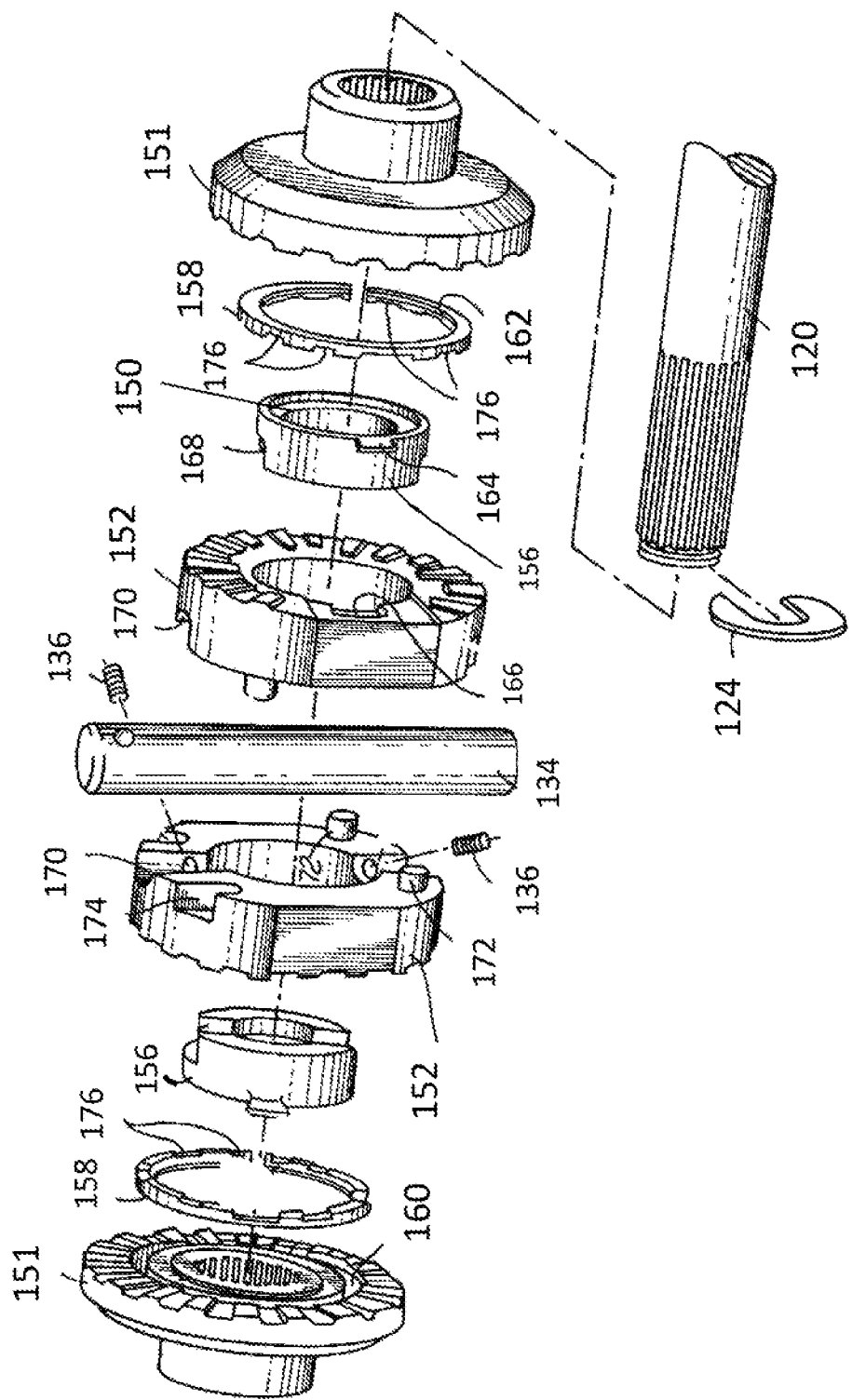
FIG. 3 illustrates an exploded view of a third locking differential.

FIG. 3 illustrates an exploded view of another locking differential. As illustrated in FIG. 3, a locking differential includes axle couplers 151 and driver 152 fitting within a differential case (not shown). In addition to axle couplers 151 and drivers 152, the embodiment of includes spacers 156 and circlips 158. The circlips 158 fit within a relief 160 in the face of each axle coupler 151.

The relief 160 has an undercut therein into which a projecting flange or ridge 162 will snap, retaining each circlip 158 at a fixed axial position with respect to the respective axle coupler 151. While the undercut is toward the axis of the assembly, the undercut could be equally functionally placed on the outer surface of relief 160.

Also, the inner or outer functional diameter of the circlip 158 is slightly less than or greater than the recess 160 so that the circlip 158, once deflected within its elastic range and snapped into position into the respective axle coupler 151, will remain slightly elastically deformed after installation so as to have adequate drag with respect to the respective axle coupler to rotate with the respective axle coupler unless forcibly prevented from doing so.

Spacers 156 each have a paddle-like projection 164 thereon, which fit into a specific location of the circlip 158, either within the split or open space between the circlip ends, or in the central region of the circlip curvature. The paddle width is smaller than opening within the circlip in such a manner as to allow a 10 degree total rotation of the circlip 158 relative to the spacer.

This relative motion could range from a minimum equal to half the driver to driver displacement plus the desired driver tooth overlap, to just less than the total angle between the individual teeth of the driver. Thus within that given freedom, each circlip 158 will rotate in unison with the respective axle coupler 151, though the circlip 158 will be restrained by the paddle 164 when contacting the same and will no longer rotate with the respective axle coupler 151 should the axle coupler 151 continue to rotate beyond that specified freedom.

In that regard, when the paddle 164 is positioned between the circlip ends, the force on the circlip 158 when the opening therein contacts the paddle 164 is a force tending to open the circlip 158, resulting in reduced or increased frictional engagement of the inner or outer diameter of the circlip 158 with the recess 160 in the respective axle coupler 151.

Each driver 152 has a relief 166 therein for receiving paddle 164 on the spacer 156. This relief 166 is for single piece case assembly purposes only, allowing the spacers 156 to fit within the inner diameter of the respective drivers 152 to be flush with the face thereof, so as to allow the parts to slide into the one-piece differential case.

Once installed, the spacers 156 are each moved axially toward their respective axle couplers 151 so that the paddles 164 fit within the gap in the circlips 158. The spacers 156 are retained in their final position by the insertion of pin 134. Thus, spacers 156 in the final assembly have no intentional rotational freedom about the axis of the assembly relative to pin 134, but rather in essence rotate in unison with the pin 134 and, thus, with each other.

This is to be compared with the drivers 152, which have a total rotational freedom about the axis of the assembly with respect to pin 134 of approximately 5 degrees because of the loose fit of the saddle-shaped depressions 170 on the drivers 152. Similarly, the drivers 152 have a relative rotation capability, one to the other, of approximately 1.5 degrees, determined by the fit of pins 172 and slots 174 in the drivers 152.

With respect to the differentials described above, U.S. Pat. Nos. 5,901,618 and 6,681,654 disclose different examples of differentials. The entire content of U.S. Pat. No. 5,901,618 is hereby incorporated by reference. The entire content of U.S. Pat. No. 6,681,654 is hereby incorporated by reference.

Figure 4:
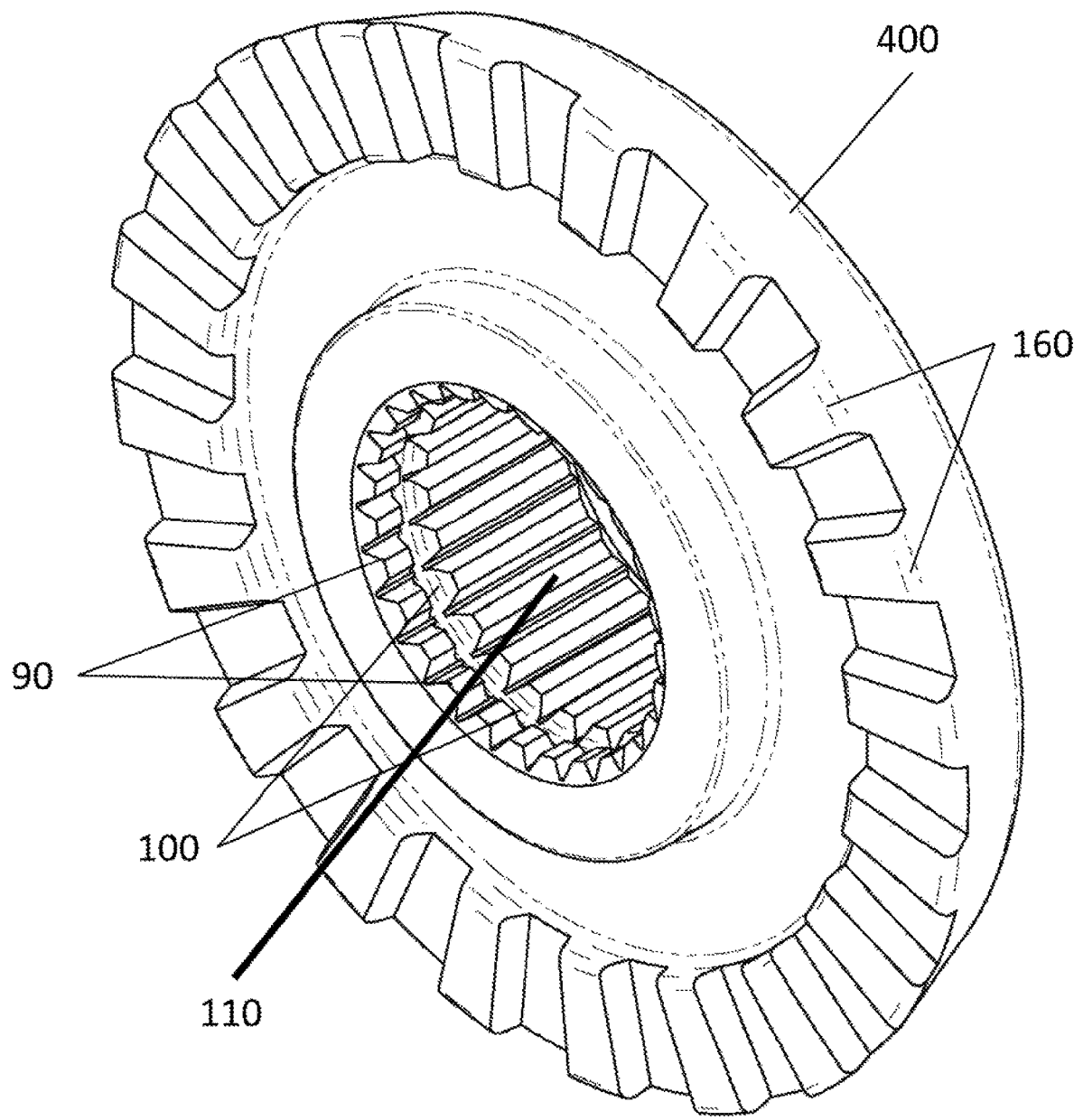
FIG. 4 illustrates an axle coupler having a recess for an axle retention mechanism.

FIG. 4 illustrates an embodiment of an axle coupler 400 having drive teeth 160 to engage the drive teeth of a corresponding driver (not shown). As discussed above, the axle coupler 400 also includes a central aperture 110 into which a vehicle axle shaft is inserted. The central aperture 110 includes teeth 90 that engage corresponding teeth on the axle shaft.

Figure 5:
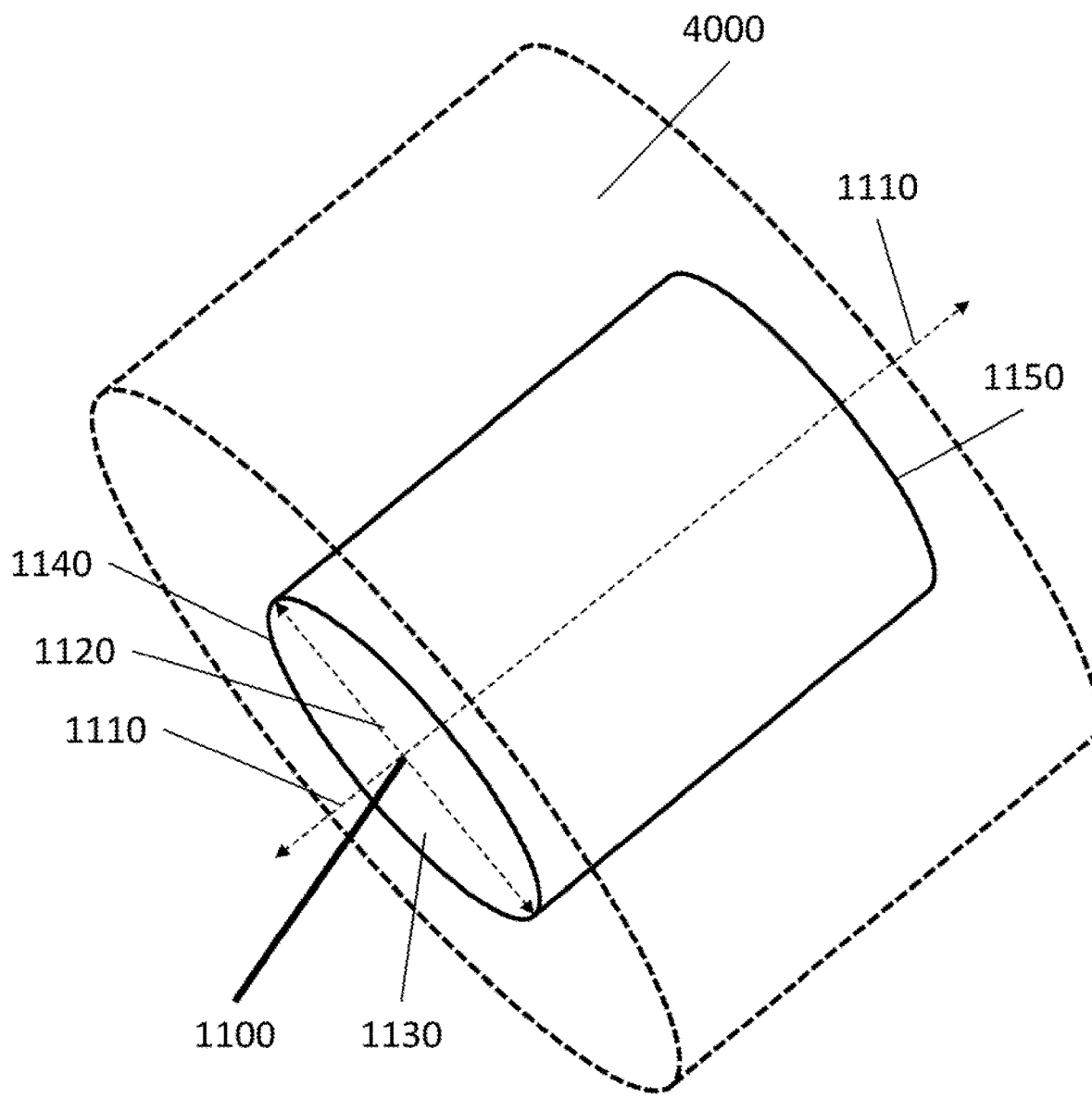
FIG. 5 illustrates a geometric view of a central aperture of an axle coupler.

As illustrated in FIG. 5, the geometric representation of an axle coupler 4000 shows a central aperture 1100 as being a cylindrical shaped volume. The central aperture 1100 has a central axis 1110 running through a center thereof and a surrounding circumferential surface 1130.

The surrounding circumferential surface 1130 is a surface that circumferentially surrounds the central axis 1110 in a first direction and extends, in a second direction that is parallel to the central axis 1110, from a first opening 1140 of the central aperture 1100 to a second opening 1150 of the central aperture 1100.

As illustrated in FIG. 4, the drive teeth 90 of the axle coupler 400 are formed on a surrounding circumferential surface (surrounding circumferential surface 1130 of FIG. 5) of the central aperture 110. The drive teeth 90 of the axle coupler 400 have a first dimensional (length) direction, which is parallel to the central axis (central axis 1110 of FIG. 5) of the central aperture 110, a second dimensional (width) direction, which is orthogonal or normal to the first dimensional direction.

The axle coupler 400, as illustrated in FIG. 4, further includes a recess or groove 100 that is formed across or orthogonal to the first dimensional direction of the drive teeth 90 of the axle coupler 400. The recess or groove 100 is shaped to receive an axle retention mechanism (not shown), wherein the axle retention mechanism provides secure engagement between an axle of a vehicle (not shown) and the axle coupler 400, without interfering with the engagement of the drive teeth 160 of the axle coupler 400 and the drive teeth of the driver (not shown).

The recess or groove 100 may be formed as a cut (groove or valley) in each individual drive tooth 90 of the axle coupler 400 so as to form a first drive tooth portion and a second drive tooth portion.

Figure 6:
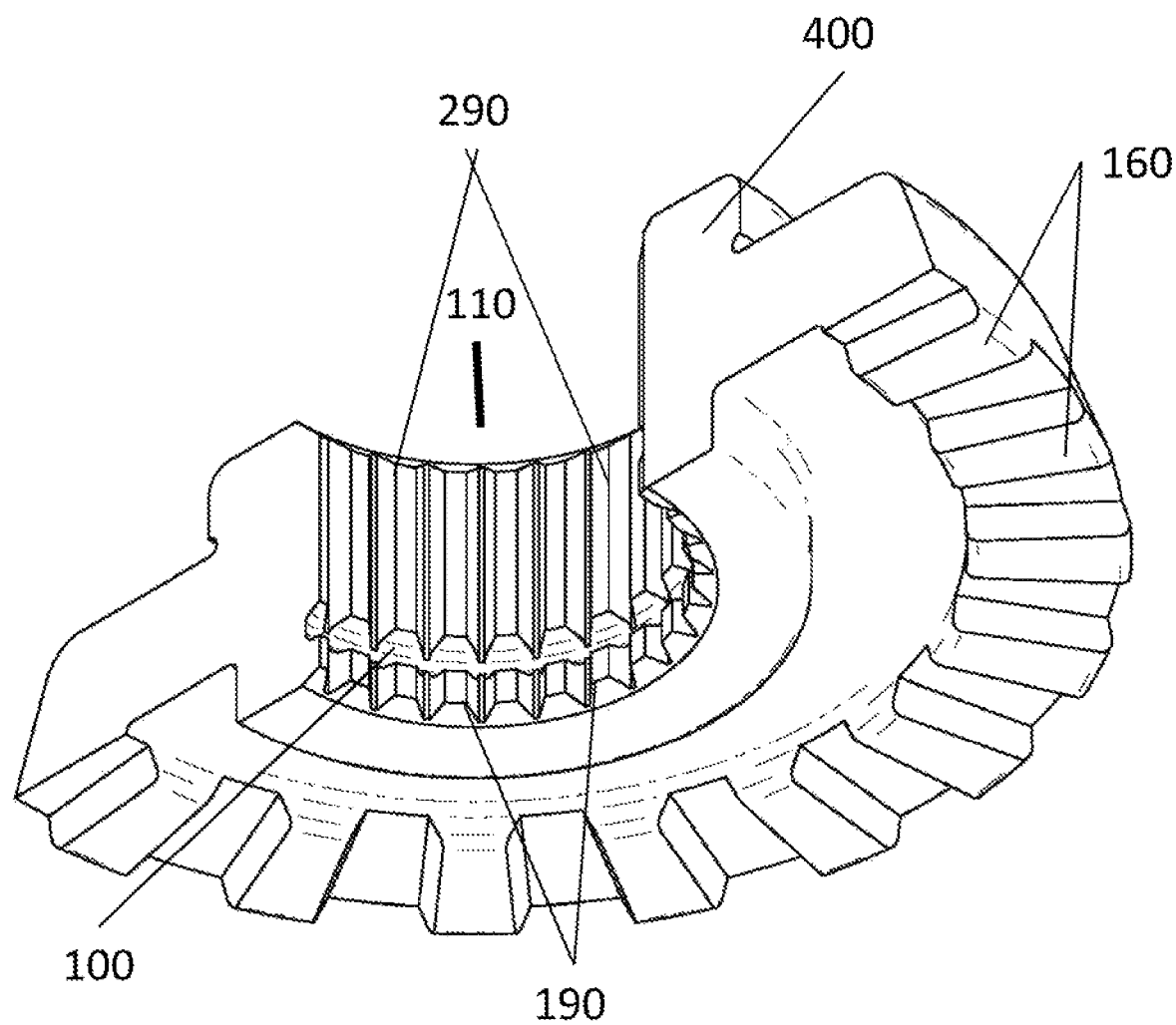
FIG. 6 illustrates a cut-away view of the axle coupler of FIG. 4 having a recess for an axle retention mechanism.

More specifically, as illustrated in FIG. 6, the cutaway view of the axle coupler 400 shows the recess or groove 100 being located between first drive tooth portions 190 and a second drive tooth portions 290.

The sides of the recess or groove 100 may be orthogonal or normal to the surrounding circumferential surface (surrounding circumferential surface 1130 of FIG. 5) of the central aperture 110 or the sides of the recess or groove 100 may be non-orthogonal to the surrounding circumferential surface (surrounding circumferential surface 1130 of FIG. 5) of the central aperture 110.

The axle retention mechanism (not shown), such as a snap ring or a clip, would be located in the cut (groove or valley) between the first drive tooth portion and the second drive tooth portion.

It is noted that the recess or groove 100 may be formed in all the drive teeth 90 of the axle coupler 400.

Alternatively, the recess or groove 100 may be formed in a subset of the drive teeth 90 of the axle coupler 400 such that the recess or groove 100 does not traverse the entire surrounding circumferential surface or does not circumferentially surrounds the entire central axis of the central aperture.

It is further noted that a length (measurement in the first dimensional direction) of the first drive tooth portion may not be equal to a length (measurement in the first dimensional direction) of the second drive tooth portion.

Alternatively, the length (measurement in the first dimensional direction) of the first drive tooth portion may be equal to a length (measurement in the first dimensional direction) of the second drive tooth portion.

In summary, an axle coupler comprising driver teeth to engage teeth of a corresponding driver; a central aperture having a central axis and a circumference; and the central aperture including axle teeth circumferentially surrounding the central axis; each axle tooth having a first dimensional direction parallel to the central axis; each axle tooth having a second dimensional direction orthogonal to the first dimensional direction; a recess formed in each axle tooth to form a first axle tooth portion and a second axle tooth portion.

The first axle tooth portion may have a first length and the second axle tooth portion having a second length; the first length being equal to the second length.

The first axle tooth portion may have a first length and the second axle tooth portion having a second length; the first length being not equal to the second length.

The driver teeth may have a dimensional direction, the dimensional direction of the driver teeth being orthogonal to the circumference of the central aperture.

An axle coupler comprising driver teeth to engage teeth of a corresponding driver; a central aperture having a central axis and a circumference; and the central aperture including axle teeth circumferentially surrounding the central axis; each axle tooth having a first dimensional direction parallel to the central axis; each axle tooth having a second dimensional direction orthogonal to the first dimensional direction; a recess formed in a portion of the axle teeth, the portion of the axle teeth being less than all of the axle teeth; the recess formed in a portion of the axle teeth forming a first axle tooth portion and a second axle tooth portion in each axle tooth the recess is formed therein.

The first axle tooth portion may have a first length and the second axle tooth portion having a second length; the first length being equal to the second length.

The first axle tooth portion may have a first length and the second axle tooth portion having a second length; the first length being not equal to the second length.

The driver teeth may have a dimensional direction, the dimensional direction of the driver teeth being orthogonal to the circumference of the central aperture.

It will be appreciated that several of the above-disclosed embodiments and other features and functions, or alternatives thereof, may be desirably combined into many other different systems or applications. Also, various presently unforeseen or unanticipated alternatives, modifications, variations, or improvements therein may be subsequently made by those skilled in the art which are also intended to be encompassed by the description above.

What is claimed is:

1. An axle coupler comprising:
   driving teeth to engage teeth of a corresponding driver;
   a central aperture having a central axis and a circumference; and
   said central aperture including axle teeth circumferentially surrounding said central axis;
   each axle tooth having a first dimensional direction parallel to said central axis;
   each axle tooth having a second dimensional direction orthogonal to said first dimensional direction;
   a recess formed in each axle tooth to form a first axle tooth portion, and a second axle tooth portion formed within said recess;
   said first axle tooth portion having a first length and said second axle tooth portion having a second length;
   said first length being not equal to said second length.

2. The axle coupler as claimed in claim 1, wherein said driving teeth having a dimensional direction, said dimensional direction of said driving teeth is orthogonal to said circumference of said central aperture.

3. An axle coupler comprising:
   driving teeth to engage teeth of a corresponding driver;
   a central aperture having a central axis and a circumference; and
   said central aperture including axle teeth circumferentially surrounding said central axis;
   each axle tooth having a first dimensional direction parallel to said central axis;
   each axle tooth having a second dimensional direction orthogonal to said first dimensional direction;
   a recess formed in a portion of said axle teeth, said portion of said axle teeth being less than all of said axle teeth;
   said recess formed in a portion of said axle teeth forming a first axle tooth portion and a second axle tooth portion in each axle tooth said recess is formed therein.

4. The axle coupler as claimed in claim 3, wherein said first axle tooth portion having a first length and said second axle tooth portion having a second length; said first length being not equal to said second length.

5. The axle coupler as claimed in claim 3, wherein said driving teeth having a dimensional direction, said dimensional direction of said driving teeth is orthogonal to said circumference of said central aperture.

* * * * *